US008874806B2

(12) United States Patent
Mopur et al.

(10) Patent No.: US 8,874,806 B2
(45) Date of Patent: Oct. 28, 2014

(54) METHODS AND APPARATUS FOR MANAGING MULTIPATHING SOFTWARE

(75) Inventors: Satish Kumar Mopur, Karnataka (IN); Pruthviraj Herur Puttaiah, Houston, TX (US); Sridhar Balachandriah, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 2475 days.

(21) Appl. No.: 11/492,830

(22) Filed: Jul. 26, 2006

(65) Prior Publication Data

US 2007/0088870 A1    Apr. 19, 2007

(30) Foreign Application Priority Data

Oct. 13, 2005  (IN) .......................... 1467/CHE/2005

(51) Int. Cl.
*G06F 3/00* (2006.01)
*G06F 5/00* (2006.01)
*G06F 11/14* (2006.01)
*G06F 11/20* (2006.01)

(52) U.S. Cl.
CPC .......... *G06F 11/201* (2013.01); *G06F 11/1433* (2013.01)
USPC .............................. 710/38; 370/351; 370/431

(58) Field of Classification Search
USPC ............................................. 710/38; 370/431
See application file for complete search history.

(56) References Cited

U.S. PATENT DOCUMENTS

| | | | | |
|---|---|---|---|---|
| 4,396,984 A | * | 8/1983 | Videki, II | 710/38 |
| 6,212,612 B1 | * | 4/2001 | Turner | 711/170 |
| 6,968,401 B2 | * | 11/2005 | McBrearty et al. | 710/38 |
| 7,222,348 B1 | * | 5/2007 | Athreya et al. | 719/321 |
| 7,389,505 B2 | * | 6/2008 | Berenberg et al. | 717/172 |
| 7,505,458 B2 | * | 3/2009 | Menon et al. | 370/389 |
| 2007/0055797 A1 | * | 3/2007 | Shimozono | 710/36 |

* cited by examiner

*Primary Examiner* — Elias Mamo

(57) ABSTRACT

An embodiment of a method of managing multipathing in a computer system including the steps of establishing a plurality of concurrent multipathing processes on the computer system; disassociating a plurality of operational data paths from a first of the multipathing processes; and associating the operational data paths with a second of the multipathing processes.

20 Claims, 8 Drawing Sheets

METHODS AND APPARATUS FOR MANAGING MULTIPATHING SOFTWARE

This application claims priority from Indian patent application IN1467/CHE/2005, filed on Oct. 13, 2005. The entire content of the aforementioned application is incorporated herein by reference.

BACKGROUND OF THE INVENTION

Multipathing is one of numerous technologies that have been developed to provide computer systems with a level of fault tolerance. More specifically, multipathing is used to provide fault tolerance against failure of a data path used to transfer data. Multipathing can be deployed in, for example, a storage area network to ensure that a host can continue to access a data storage device despite the failure of a data path between the host and the data storage device, given the availability of multiple data paths to the data storage device. Multipathing technology is generally most effective when there exists redundant hardware components forming multiple data paths to the data storage device in the Storage Area Network. This is referred to as Hardware High Availability.

To provide fault tolerance against data path failure, multipathing technology manages multiple redundant data paths. Multipathing technology is arranged to detect failure of an active data path used to transfer data and automatically switch to one of the redundant data paths so that transfer of data can continue despite failure of the active data path. The action of detecting the failure of an active data path and switching to one of the redundant data paths is sometimes referred to as "failover".

Multipathing technology is typically implemented in the form of a driver (that is, a piece of software), which can be installed on a host computer. A disadvantage of this approach is that when existing multipathing drivers are installed on a host computer and are upgraded (that is, replaced with a newer version) they may not provide failover functionality during the upgrade process. Consequently, if the active data path being used to transfer data fails during the upgrade process, the transfer of data will be interrupted until such time as the upgrade process is complete.

Furthermore, existing multipathing drivers are such that the host computer may need to be rebooted subsequent to an upgraded version of the multipathing driver being installed on the host computer. The reboot is typically required to ensure the upgraded driver is properly executed by the host computer. A consequence of rebooting the host computer is that the transfer of data via the active data path will be halted until such time as the host computer has completed the reboot process.

A BRIEF DESCRIPTION OF THE DRAWINGS

Embodiments of the invention will now be described by way of example only with reference to the drawings in which.

Figure 1:
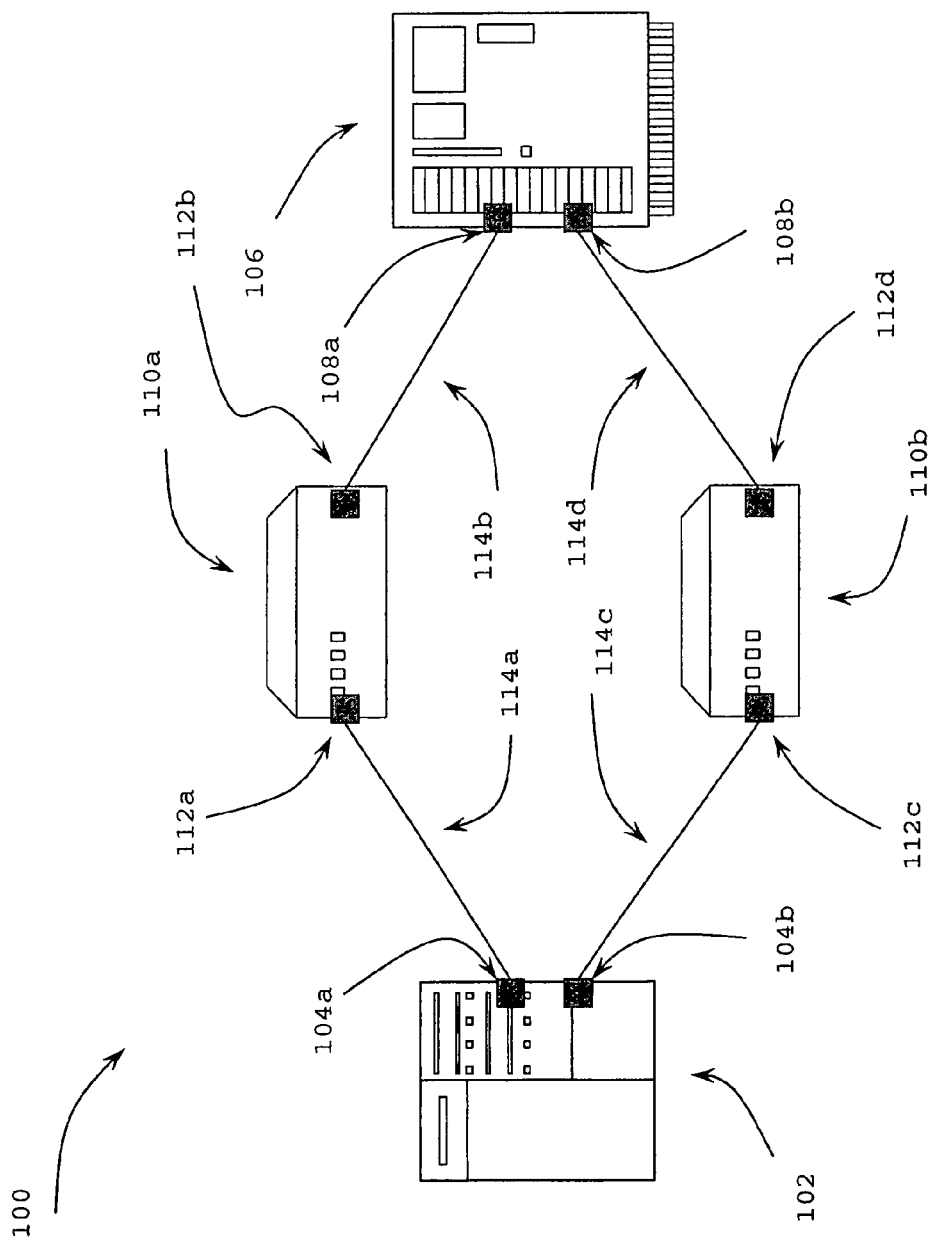
FIG. 1 is a schematic diagram of a storage area network that includes an embodiment of the present invention.
Figure 3A:
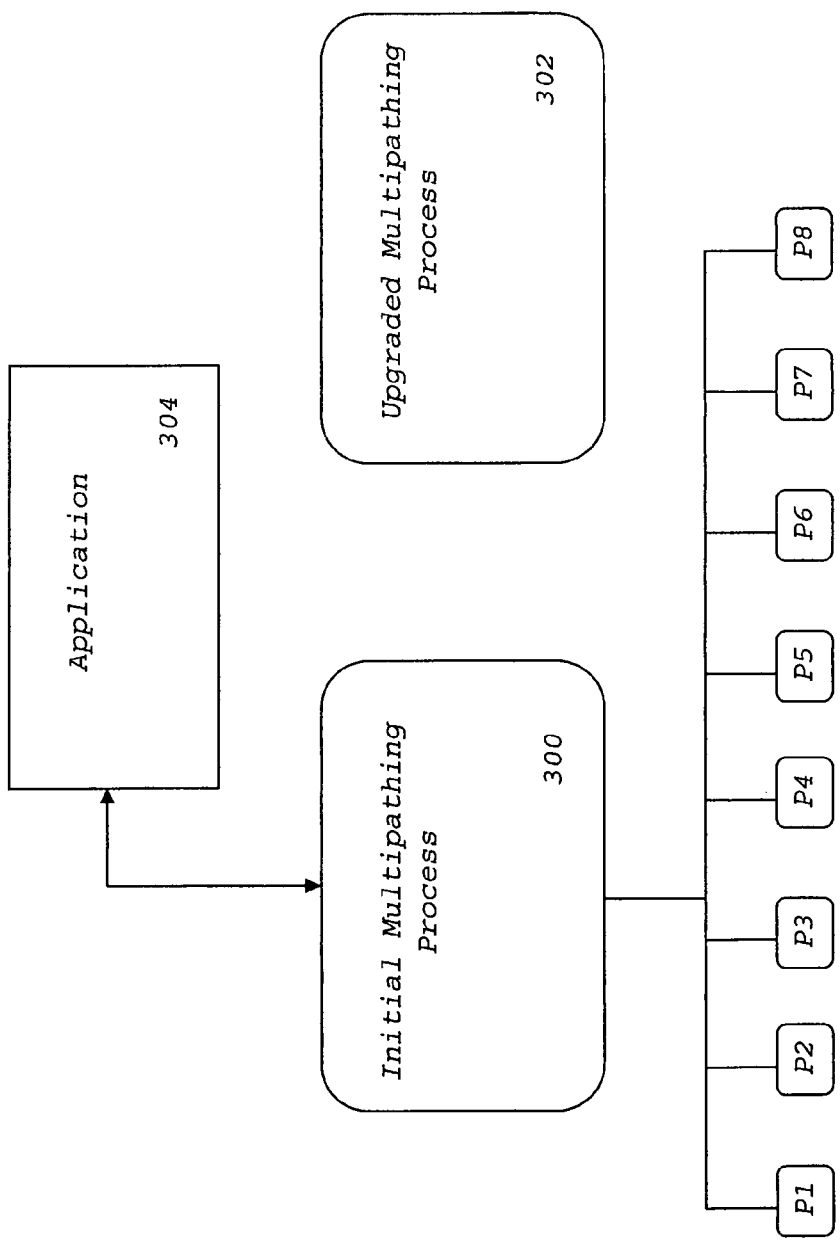
Figure 3B:
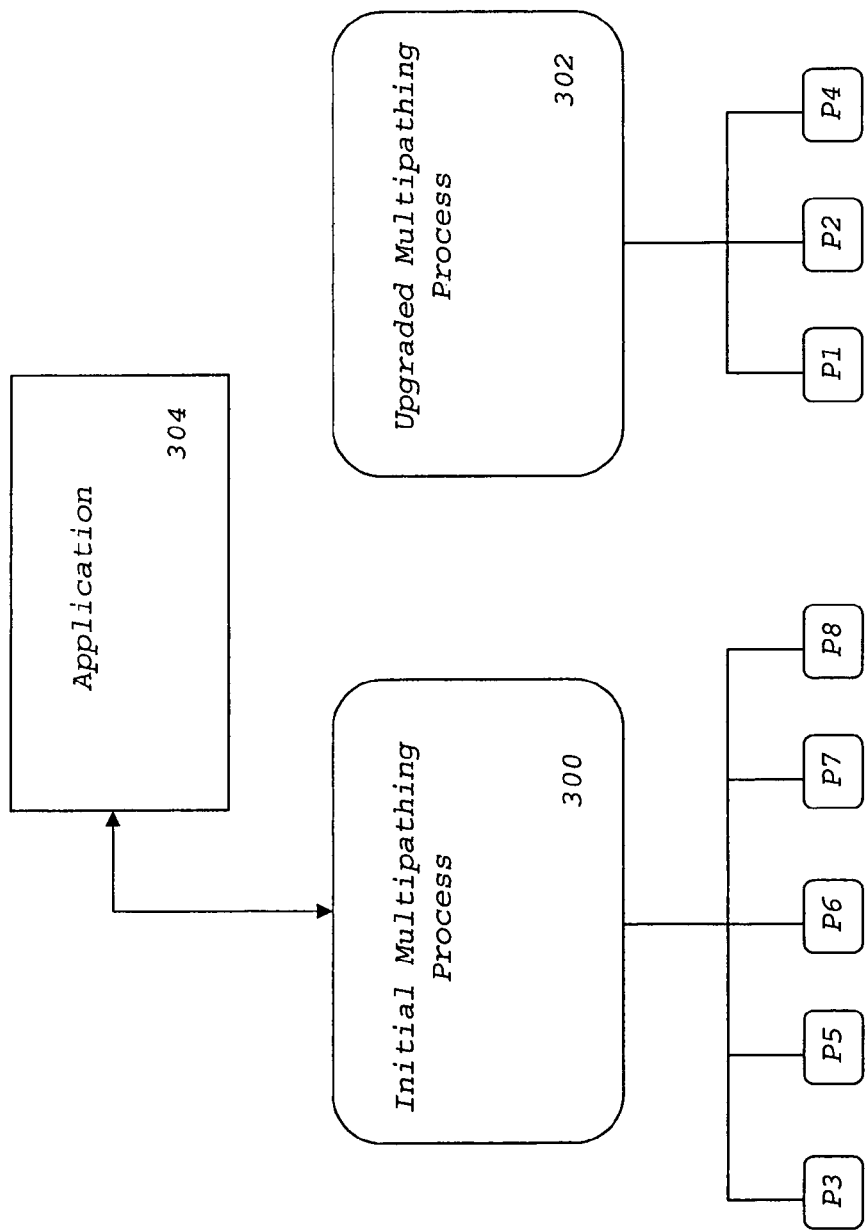
Figure 3C:
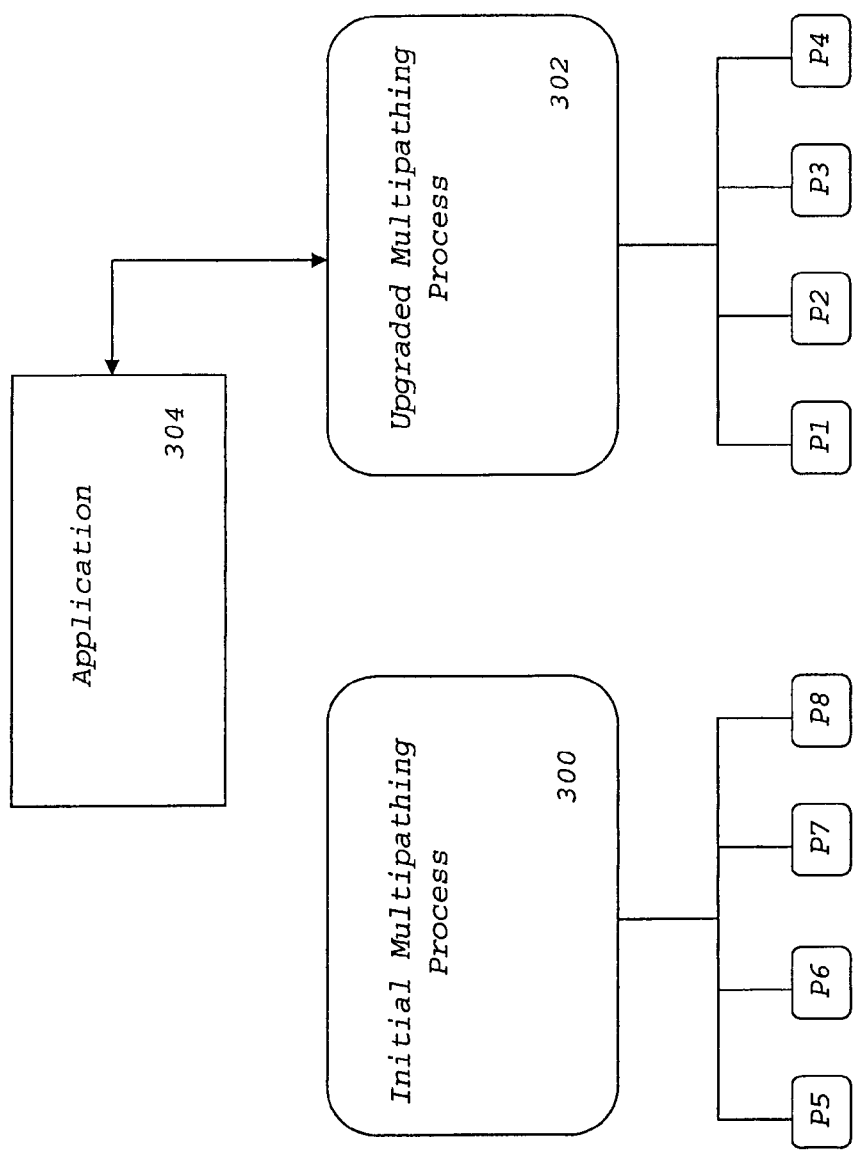
Figure 3D:
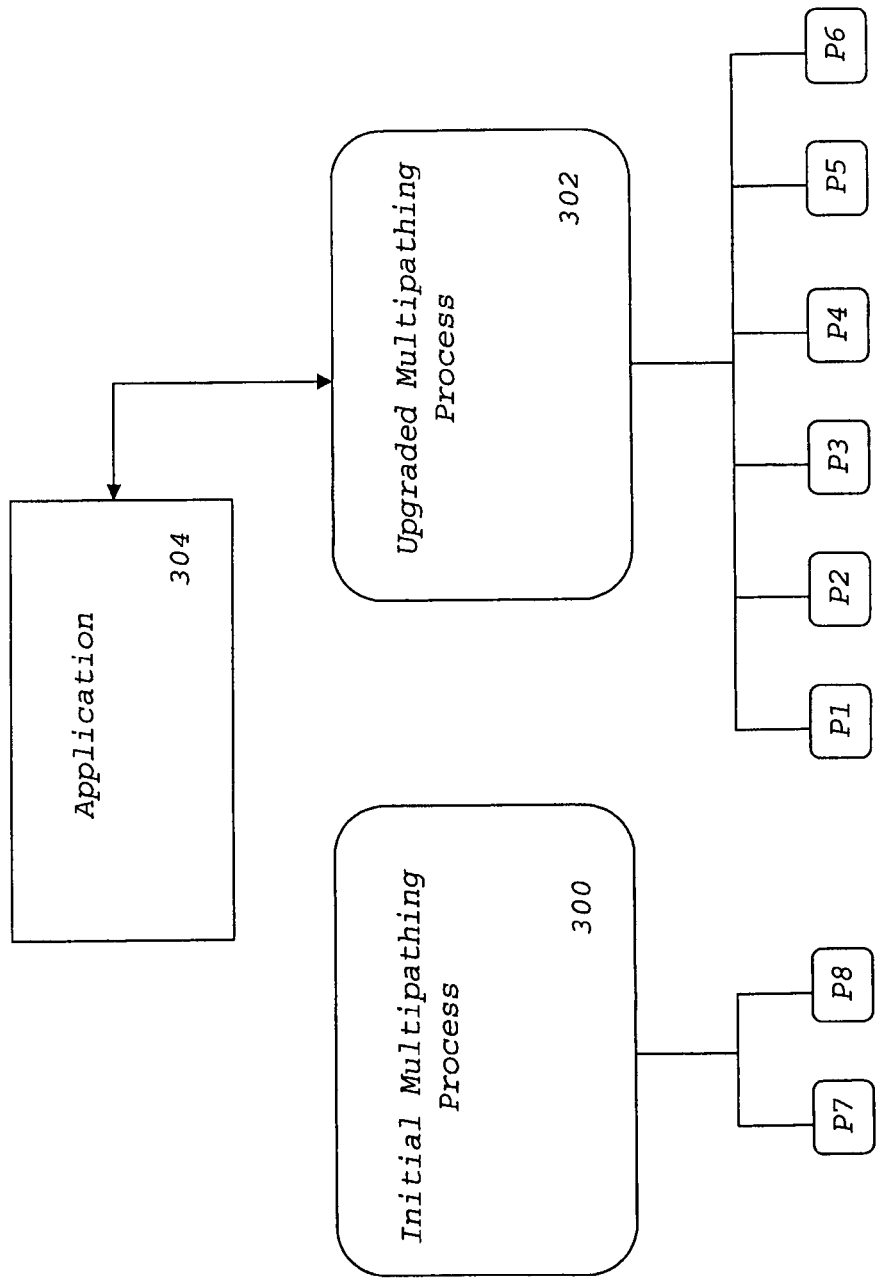
Figure 3E:
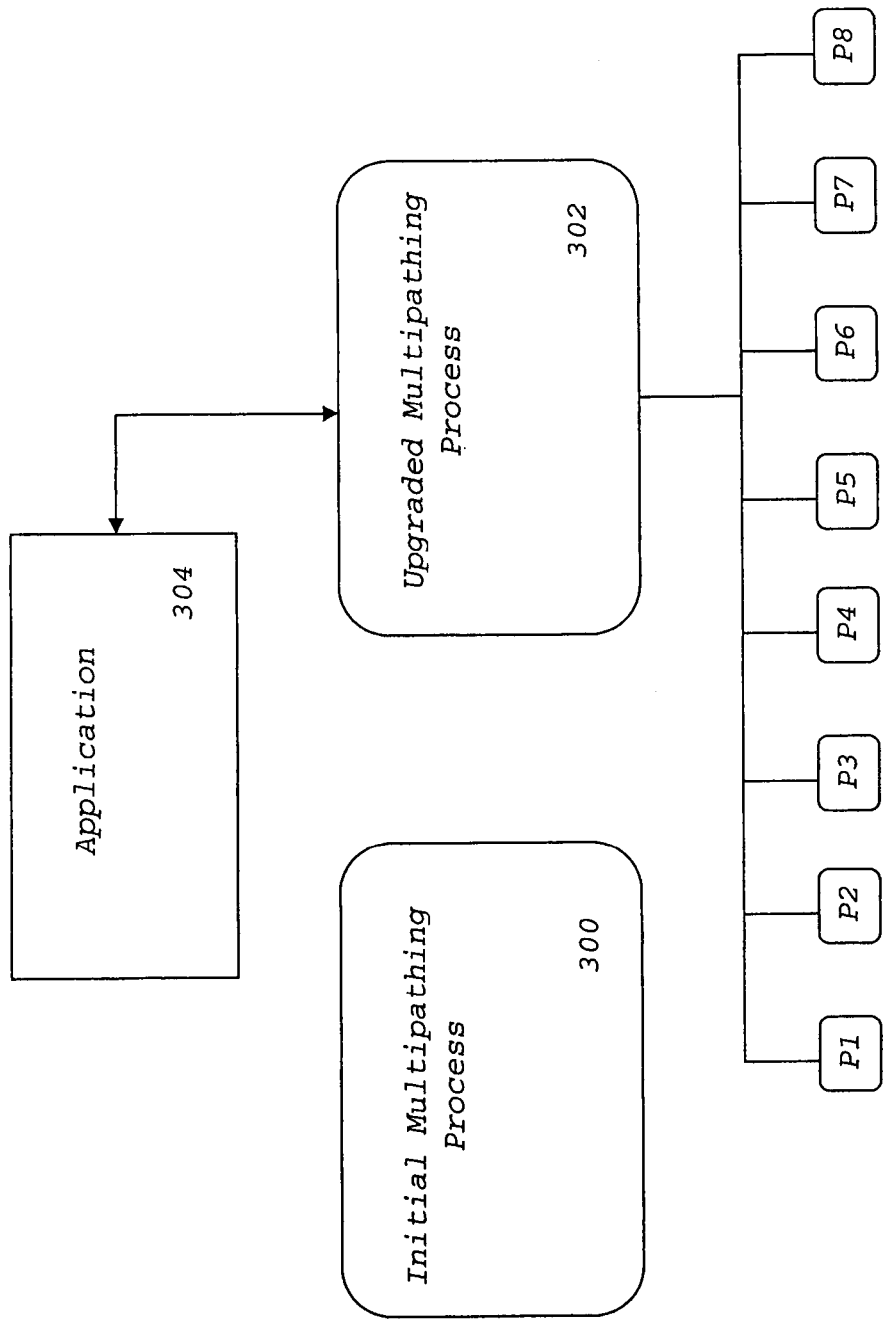
Figure 4:
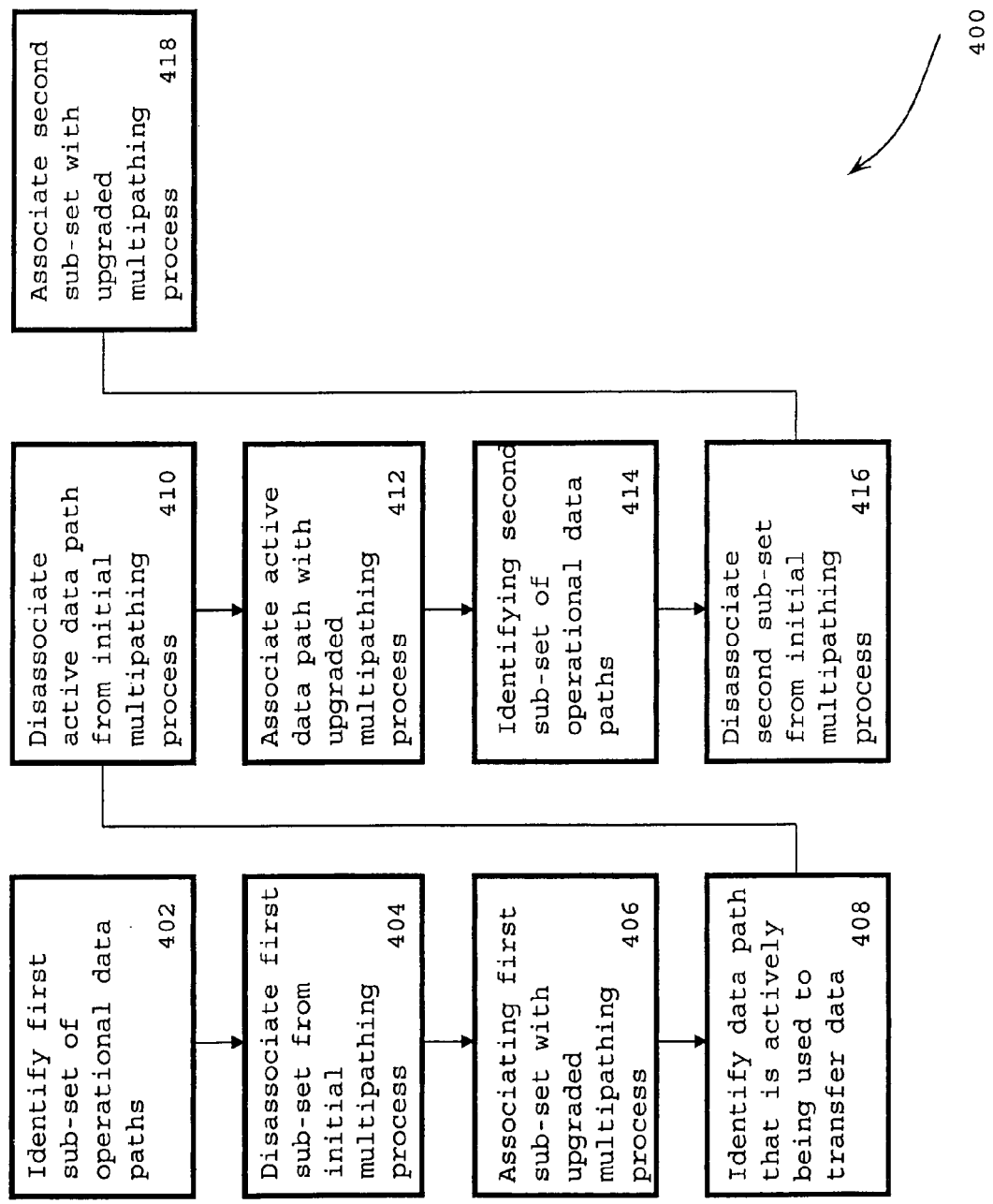

FIGS. 3(a) to 3(e) are schematic representations of processes executing on a host computer in the storage area network of FIG. 1 in accordance with an embodiment of the present invention; and FIG. 4 is a flow chart of other steps performed by the storage area network of FIG. 1 in accordance with an embodiment of the present invention.

DETAILED DESCRIPTION OF EMBODIMENTS OF THE INVENTION

According to an embodiment of the present technique a method of managing multipathing in a computer system includes a step of establishing a plurality of concurrent multipathing processes on the computer system. In addition to the step of establishing the concurrent multipathing processes the embodiment of the method includes the step of disassociating a plurality of operational data paths from a first of the multipathing processes. Furthermore, the embodiment of the method includes the step of associating the operational data paths with a second of the multipathing processes. The selection process for disassociating the plurality of operational data paths is preferably based on the hardware High Availability to ensure at least one operable path to either of the multipathing processes.

The disclosed technique will be more fully understood from the following description of specific embodiments.

With reference to FIG. 1, the storage area network 100 includes a host computer 102 in the form of a HP 9000 computer server, which is available from Hewlett Packard Company of the United States of America. The host computer 102 has several host bus adaptors installed that provide fibre channel data ports 104. Each port 104 is supported by a different host bus adaptor, which is in the form of a HP StorageWorks A6826A from Hewlett Packard Company. The hard disk of the host computer 102 is loaded with several pieces of software including an operating system in the form of HP-UX, a multipathing driver from Hewlett Packard Company and multipathing registration infrastructure such as Hewlett-Packard Upper Layer Module services. The multipathing driver interacts with the host bus adaptors to provide the operating system (or software applications loaded on the hard disk of the host computer 102) with fault tolerant data paths for sending and/or receiving data via the data ports 104.

For the sake of brevity, the storage area network 100 is described in the context of having a single host computer 102. It is, however, envisaged that the storage area network 100 is not limited to a single host computer 102 and in fact can include more than one host computer 102. More than one host computer 102 can be used, for example, to provide a cluster computer system, which provides a level of fault tolerance against failure of a computer.

The storage area network 100 also includes a fibre channel disk array 106 in the form of a HP StorageWorks XP128 disk array from Hewlett Packard Company. The fibre channel disk array 106 has several controllers installed that provide fibre channel data ports 108. Each controller is a fibre channel interface which is a part of the fibre channel disk array available from Hewlett-Packard Company.

Again for brevity, this description of the storage area network 100 is in the context of having a single data storage device in the form of the fibre channel disk array 106. However, it is envisaged that the storage area network 100 need not be limited to a single data storage device and can include more than one such device of different types. In this regard, the storage area network 100 can include different types of data storage devices and is not limited to including more than one fibre channel disk array 106. For example, the network 100 could include data storage devices such as magnetic tape drives and CD-RW drives. More than one data storage device can be employed to, for example, provide more data storage capacity or to physically segregate data for security reasons. Further, it is envisaged that the storage area network 100 is not limited to fibre channel connectivity and can include other storage connectivity protocols such as iSCSI.

In addition to the host computer 102 and the fibre channel disk array 106, the storage area network 100 includes two fibre channel switches 110 each of which is in the form of a HP StorageWorks SAN Switch 4/32 from Hewlett Packard Company. The fibre channel switch 110 includes several fibre optic data ports 112 for sending and/or receiving data. The storage area network includes two fibre channel data switches 110 to provide redundancy against failure of one of the switches 110. The redundancy of data paths need not be achieved only thru switches.

The system 100 also includes physical data media 114 each of which is in the form of a multi-mode fibre optic data cable from Hewlett Packard Company. One of the physical data media 114a is optically coupled to a first data port 104a of the host computer 102 and a first data port 112a of the fibre channel switch 110a. Another of the physical data media 114c is optically coupled to a second data port 104b of the host computer 102 and a data port 112c of the other fibre channel switch 110b. In this regard, the physical data media 114a and 114c support the transfer of data between the host computer 102 and the fibre channel switches 110.

The physical data media 114 also includes a medium 114b that is optically coupled to another port 112b of the fibre channel switch 110a and a first data port 108a of the disk array 106. Furthermore, the data media 114 includes a physical medium 114d that is optically coupled to a data port 112d of the other fibre channel switch 110b and a second data port 108b of the disk array 106. The physical data medium 114b and 114d support the transfer of data between the switches 110 and the disk array 106.

The host computer 102 and the fibre channel disk array 106 transfer data between each other. The data is typically transferred in response to the host computer 102 writing data to, or reading data from, the fibre channel disk array 106. In this regard, the host computer 102 and the fibre channel disk array 106 use the data paths provided by the host multipathing driver to transfer data. Consequently the transfer of data is supported by the host bus adaptors, which send and receive data via their respective data ports 104 and 108 and by means of the physical media 114 that is optically coupled thereto. The fibre channel switches 110 also have a role in supporting the transfer of data between the host computer 102 and the fibre channel disk array 106. The role of the fibre channel switches 110 involves switching data received on one of its ports 112a and 112e to another of its ports 112b and 112d.

Figure 2:
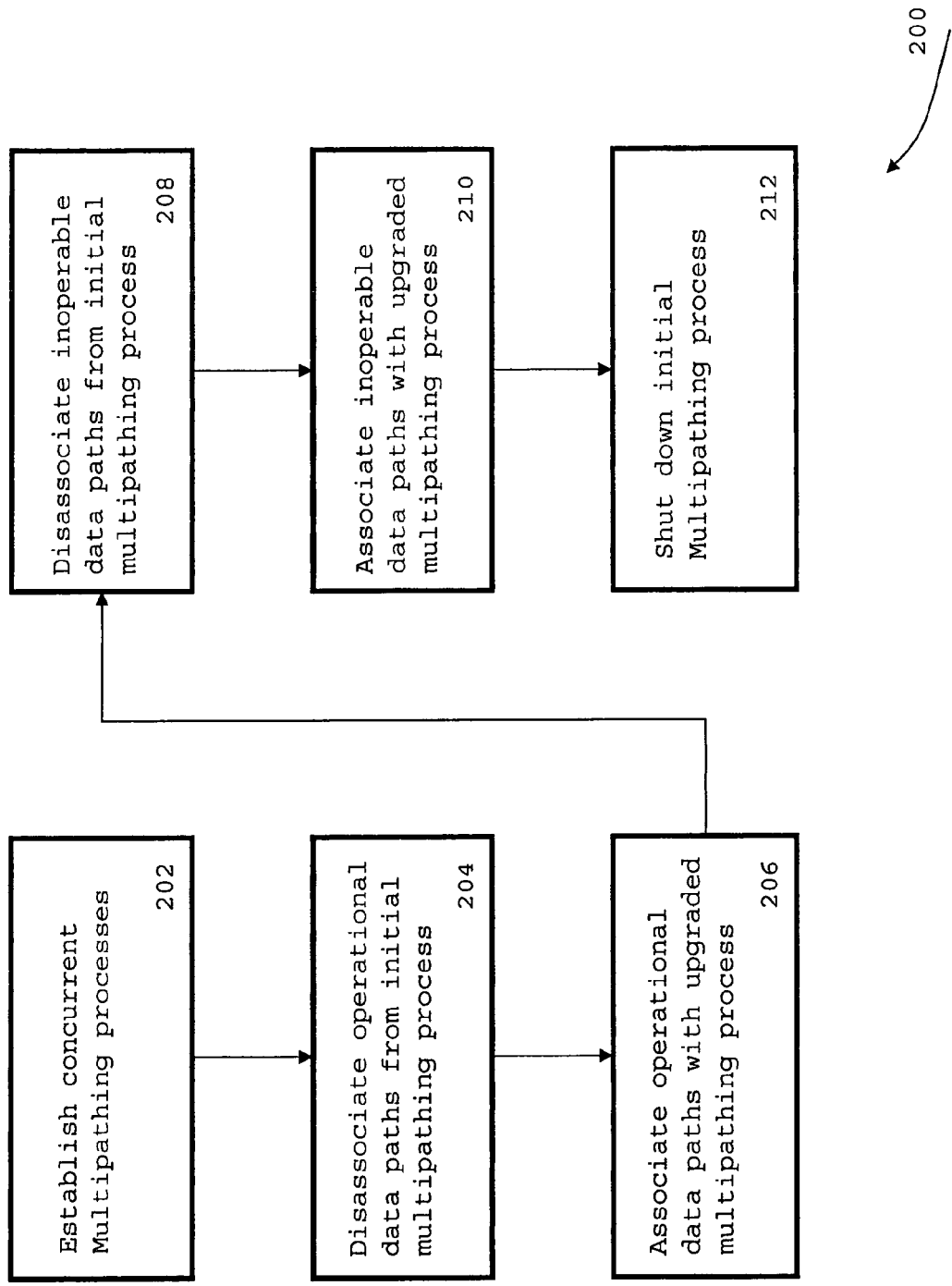
FIG. 2 is a flow chart of steps performed by the storage area network of FIG. 1 in accordance with an embodiment of the present invention.

According to the illustrated and described embodiment, the multipathing driver loaded on the host computer 102 is such that it independently performs various steps 202 to 212, which are set out in the flow chart 200 of FIG. 2, when being upgraded to a later version. The multipathing driver loaded on the host computer 102 might, for example, be upgraded to a later, newer version to fix a bug in the previous version of the driver.

The first step 202 involves establishing concurrent multipathing processes 300 and 302, which are depicted in FIG. 3(a). When upgrading the multipathing driver loaded on the host computer 102 the concurrent multipathing processes 300 and 302 run on the host computer 102. The concurrent multipathing processes 300 and 302 include an initial multipathing process 300 that is started when the host computer 102 loads up the multipathing driver installed thereon (typically as a dynamically loadable kernel module). The initial multipathing process 300 is in effect the process (driver) which is to be updated. The concurrent multipathing processes 300 and 302 also include an upgraded multipathing process 302. This upgraded multipathing process 302 is started up when an administrator of the storage area network 100 executes (on the host computer 102) an upgrade program for upgrading the multipathing driver. The upgrade program is typically made available by the manufacturer of the hosts/host bus adaptors/disk arrays/switches, which in this embodiment is Hewlett Packard Company.

With reference to FIG. 3(a), subsequent to the step 202 of establishing the concurrent multipathing processes 300 and 302 the initial multipathing process 300 retains responsibility for managing the data paths P1 to P8, which are used to transfer data as may be required by the application software 304. As described previously, the data paths P1 to P8 are supported by the host bus adaptors and data ports 104 and 108 thereof, and the fibre channel data switches 110. Until additional steps 204 and 206 are performed the upgraded multipathing process 302 does not have any association or responsibility for the data paths P1 to P8.

Following on from the initial step 202, the multipathing driver carries out the step 204 of disassociating one or more of the data paths P1 to P8 that are operational from the initial multipathing process 300. The operational data paths P1 to P8 are those paths that are in an active state so that they can potentially be used to transfer data. In this regard, it is noted that the data paths P1 to P8 may potentially be in an inoperable state in which the data paths P1 to P8 can not or are not used to transfer data. A data path P1 to P8 can, for example, be in an inoperable state due to failure of a host bus adaptor in the host computer 102.

For the purposes of describing the present embodiments of the technique disclosed here, it is assumed that data paths P1 to P6 are operational, while data paths P7 and P8 are inoperable. As such, the step 204 of disassociating the operational data paths would result in data paths P1 to P6 being disassociated from the initial multipathing process 300. Once the step 204 of disassociating the operational data paths P1 to P6 has been carried out, the multipathing driver performs the step 206 of associating the operational data paths P1 to P6 with the upgraded multipathing process 302. The operational data paths P1 to P6 associated with the upgraded multipathing process 302 are those paths disassociated from the initial multipathing process 300 during the previous step 204.

An advantage of having a multipathing driver perform the preceding steps 202 to 206 is that the steps ameliorate the need to reboot the host computer 102 subsequent to an upgraded multipathing driver being installed. The need to reboot the host computer 102 is ameliorated by virtue of the fact that the data paths P1 to P6 are 'handed over' from the initial multipathing process 300 to the upgraded multipathing process 302. In contrast, however, the take over of the data paths P1 to P6 is performed by the upgraded multipathing process in existing storage area networks by un-installing the initial multipathing process and installing the newer version subsequently. This results in either a host reboot or loss of high availability.

When performing the previous steps 204 and 206 the multipathing processes 300 and 302 perform specific steps 402 to 418, which are shown in the flow chart 400 of FIG. 4. The first step 402 involves identifying a first sub-set of the operational data paths P1 to P6 that may or may not be used by the initial multipathing process 300 to transfer data. For the sake of being able to exemplify the present embodiments of the disclosed technique, it is assumed that P3 has been chosen by the application 304 to transfer data. The other operational data paths P1, P2, and P4 to P6 can be considered 'alternative' data paths that are engaged either due to the failure of P3 or for load distribution. Assuming P3 is used to transfer data, then the step 402 of identifying the first sub-set of operational data paths involves selecting the first sub-set from data paths P1, P2, and P4 to P6.

When performing the step 402 of selecting the first sub-set of the operational data paths P1 to P6 the multipathing driver selects (n−1)/2 of the operational data paths P1, P2, and P4 to P6, where n is the total number of operable data paths P1, P2, and P4 to P6 (which in this description is five). Furthermore, when carrying out the step 402 of selecting the first sub-set of the operational data paths the multipath driver selects the first sub-set of the data paths P1, P2, and P4 to P6 such that the entire first sub-set will not be rendered inoperable in the event a single component of the storage area network 100 fails. For instance, the entire first sub-set will include data paths that traverse both fibre channel data switches 110. Consequently the entire first sub-set of the operational data paths P1, P2, and P4 to P6 will not be rendered inoperable should one of the fibre channel data switches 110a fail. The step 402 of selecting the first sub-set of data paths is done using a hardware high availability map, which is constructed by the initial multipathing process 300.

For the sake of describing the present embodiments it is assumed that the first sub-set of operational data paths includes data paths P1, P2 and P4. Once the initial step 402 of identifying the first sub-set of data paths P1, P2 and P4 has been performed, the next step 404 that is performed involves disassociating the first sub-set of data paths from P1, P2 and P4 from the initial multipathing process 300. Following on from the step 404 of disassociating the first sub-set of data paths P1, P2 and P4 is the step 406 of associating the first sub-set of data paths P1, P2 and P4 with the upgraded multipathing process 302. The result of the previous three steps 402 to 406 can be seen in FIG. 3(b). It is noted that at this stage the transfer of data is still managed by the initial multipathing process 300 because it is still associated with the data path P3 that is actively being used to transfer data.

Once the step 406 of associating the first sub-set of data paths P1, P2 and P4 has been performed, the next step 408 involves identifying the data path which is actively being used by the initial multipathing process 300 to transfer data. As indicated previously, for the purposes of exemplifying the present embodiments it is assumed that data path P3 is being actively used to transfer data. As such, the step 408 of identifying the data path results in data path P3 being identified. Once the active data path P3 has been identified, the next step 410 that is performed is to disassociate the active data path P3 from the initial multipathing process 300 and then carrying out the step 412 of associating the active data path P3 with the upgraded multipathing process 302. The result of the previous steps 408 to 412 is illustrated in FIG. 3(c). Once the active data path P3 has been associated with the upgraded multipathing process 302, all data from the application 304 is transferred by the upgraded multipathing process 302.

Subsequent to the step 412 of associating the active data path P3 with the upgraded multipathing process 302, the step 414 of identifying a second sub-set of the operational data paths P1 to P8 is performed. The second sub-set of the operational data paths P1 to P8 includes those data paths that remain associated with the initial multipathing process 300 after the previous step 412. In the case of the present description the second sub-set includes P5 and P6. As stated previously, data paths P7 and P8 are inoperable and so are not included in the second sub-set. At this stage, the next step 416 that is performed is to disassociate the second sub-set of data paths P5 and P6 from the initial multipathing process 300 and to carry out the step 418 of associating the second sub-set with the upgraded multipathing process 302. The result of the preceding steps 414 to 418 is shown in FIG. 3(d).

In addition to performing the various steps 202 to 206 and 402 to 418 to hand over the operational data links P1 to P6 from the initial multipathing process 300 to the upgraded multipathing process 302, the multipathing processes 300 and 302 are also arranged to handover inoperable data paths P7 and P8. In this regard, the initial step 208 involved in handing-over the inoperable data paths P7 and P8 is to disassociate the data paths P7 and P8 from the initial multipathing process 300. Once the inoperable data paths P7 and P8 have been disassociated, the next step 210 includes associating the data paths P7 and P8 with the upgraded multipathing process 302. The result of performing the all the aforementioned steps is shown in FIG. 3(e).

In the present embodiments of the technique disclosed the steps 414 to 418 involved in handing-over the inoperable data paths P7 to P8 are actually performed prior to the steps 202 to 206 and 402 to 418 involved in handing-over the operational data paths P1 to P6. Consequently, the inoperable data paths P7 to P8 would be associated with the upgraded multipathing process 302 before any of the operational data paths P1 to P6.

Once all the data paths P1 to P8 have been handed-over from the initial multipathing process 300 to the upgraded multipathing process 302, the final step 212 of shutting down the initial multipathing process 300 is performed. Shutting down the initial multipathing process 300 involves terminating the process 300 so that it no longer runs on the host computer 102.

In order to handover the data paths P1 to P8 from the initial multipathing process 300 to the upgraded multipathing process 302, both processes 300 and 302 communicate with each other using, for example, the ioctl( ) function. The ioctl( ) function that enables a variety of control functions to be performed on a device driver. A more detailed description of how the ioctl( ) function is used by the processes 300 and 302 is as follows in the subsequent paragraphs.

Shortly after being executed, the upgraded multipathing process 302 calls ioctl() to verify with the initial multipathing process 300 that the upgrade process can continue. The initial multipathing process 300 returns information to the upgraded multipathing process 302 whether it can proceed with the upgrade process. Assuming that the upgrade process can proceed, the upgraded multipathing process 302 calls ioctl( ) to cause the initial multipathing process 300 to disassociate all inoperable data paths P7 and P8 (this steps 414 to 418). Once the inoperable data paths P7 and P8 have been disassociated, the initial multipathing process 300 returns from the ioctl( ) informing the upgraded multipathing process 302 about the disassociated paths P7 and P8. In response, the upgraded multipathing process 302 queues the data paths P7 and P8 for later registration with the multipathing registration infrastructure by the upgraded multipathing process 302 when, and if, the paths P7 and P8 become operable.

On discovering an operable storage device (for example, the fibre channel disk array 106), the upgraded multipathing process 302 calls ioctl( ) to indicate to the initial multipathing process 300 that it wants to claim the storage device. In response, the initial multipathing process 300 disassociates itself from an operable data path P1 to P6 in accordance with the aforementioned steps 402 to 412. Once it has disassociated itself, the initial multipathing process 300 informs the upgraded multipathing process 302 about the disassociated data path P1 to P6 by calling the ioctl( ).

On receiving information about the disassociated data path P1 to P6 from the initial multipathing process 300, the upgraded multipathing process 302 proceeds to register the data path in accordance with the previous steps 402 to 412. In the event that the upgraded multipathing process's call of ioctl( ) to claim the operable storage device fails, the initial multipathing process 300 will return an error to the upgraded multipathing process 302. On receiving the error, the upgraded multipathing process 302 tries to register the disassociated path once and if that does not succeed the upgraded multipathing process 302 places the disassociated data path into a queue for later registration with the multipathing registration infrastructure.

Once the initial multipathing process 300 has disassociated all data paths P1 to P8 (in accordance with the preceding steps 402 to 418), the initial multipathing process 300 calls ioctl( ) to indicate the state, to the upgraded multipathing process 302. At this point, the upgraded multipathing process 302 can proceed to register other storage devices, as described above.

If during any of the previous steps the data path P3 that is being actively used to transfer data is in fact inoperable, the upgraded multipathing process 302 performs a graceful reversal of the preceding steps to abort the upgrade process.

An embodiment of a computer system includes a processing means arranged to perform the step of establishing a plurality of concurrent multipathing processes on the computer system. The processing means is also arranged to perform the step of disassociating a plurality of operational data paths from a first of the multipathing processes. Furthermore, the processing means is arranged to perform the step of associating the operational data paths with a second of the multipathing processes.

An embodiment of a computer program includes at least one instruction, which when executed by a computing system causes the computing system to perform the step of establishing a plurality of concurrent multipathing processes on the computer system. When executed, at least one instruction also causes the computing system to disassociate a plurality of operational data paths from a first of the multipathing processes. In addition to the previous two steps, execution of the at least one instruction causes the computing system to associate the operational data paths with a second of the multipathing processes.

While the present technique has been described with reference to the aforementioned embodiments, it will be understood by those skilled in the art that alterations, changes and improvements may be made and equivalents may be substituted for the elements thereof and steps thereof without departing from the scope of disclosed technique. In addition, many modifications may be made to adapt to a particular situation or material to the teachings of the present disclosure without departing from the central scope thereof. Such alterations, changes, modifications and improvements, though not expressly described above, are nevertheless intended and implied to be within the scope and spirit of the technique disclosed here. Therefore, it is intended that the technique disclosed here is not be limited to the particular embodiments disclosed as the best mode contemplated for carrying out this technique, but that the technique will include all embodiments falling within the scope of the independent claims.

The invention claimed is:

1. A method of upgrading a process managing control of a plurality of operational data paths in a multipathing computer system, the method comprising the steps of:

establishing a plurality of concurrent operating multipathing processes responsible for managing the plurality of operational data paths on the computer system, said concurrent operating processes comprising an initial multipathing process and an upgraded multipathing process;

disassociating a plurality of operational data paths from the initial multipathing process; and associating the operational data paths with the upgraded multipathing process.

2. A method of upgrading a process managing control of a plurality of operational data paths in a multipathing computer system, the method comprising the steps of:

establishing a plurality of concurrent operating multipathing processes responsible for managing the plurality of operational data paths in the computer system, said concurrent operating multipathing processes comprising an initial multipathing process and an upgraded multipathing process;

disassociating operational data paths from the initial multipathing process; and associating the disassociated operational data paths with the upgraded multipathing process, wherein the step of disassociating the operational data paths comprises the steps of:

identifying a first sub-set of the operational data paths that are not being used to transfer data;

disassociating the first sub-set of the operational data paths from the initial multipathing process;

identifying an active one of the operational data paths that is being used to transfer data;

disassociating the active one of the operational data paths from the initial multipathing process;

identifying a second sub-set of the operational data paths that are associated with the initial multipathing processes; and disassociating the second sub-set of the operational data paths from the initial multipathing process.

3. The method as claimed in claim 2, wherein the step of associating the disassociated operational data paths comprises the steps of:

associating the first sub-set of operational data paths with the upgraded multipathing process;

associating the active one of the operational data paths with the upgraded multipathing process; and associating the second sub-set of the operational data paths with the upgraded multipathing process.

4. The method as claimed in claim 1, further comprising the steps of:

disassociating at least one inoperable data path from the initial multipathing process; and associating the inoperable data path with the upgraded multipathing process.

5. The method as claimed in claim 1, further comprising:

terminating the initial multipathing process subsequent to performing the steps of disassociating the operational data paths from the initial multipathing process and disassociating the inoperable data path from the initial multipathing process.

6. The method as claimed in claim 2, wherein the first sub-set of the operational data paths are supported by a plurality of communication elements such that failure of one of the communication elements does not render the first sub-set of operational data paths inoperable.

7. The method as claimed in claim 2, wherein the first sub-set of the operational data paths comprises $(n-1)/2$ paths, wherein n represents a total number of the operational data paths.

8. The method as claimed in claim 1, wherein the upgraded multipathing process correspond to a different version of the initial multipathing process.

9. A computer system comprising a processing means arranged to perform the steps of:
   establishing a plurality of concurrent operating multipathing processes responsible for managing a plurality of operational data paths on the computer system, said concurrent operating processes comprising an initial multipathing process and an upgraded multipathing process;
   disassociating the plurality of operational data paths from the initial multipathing process; and
   associating the operational data paths with the upgraded multipathing process.

10. A computer system comprising a processing means arranged to perform the steps of:
    establishing a plurality of concurrent operating multipathing processes responsible for managing a plurality of operational data paths on the computer system, said concurrent operating processes comprising an initial multipathing process and an upgraded multipathing process;
    disassociating the plurality of operational data paths from the initial multipathing process; and
    associating the disassociated operational data paths with the upgraded multipathing process,
    wherein disassociating the operational data paths from the initial multipathing process comprises:
    identifying a first sub-set of the operational data paths that are not being used to transfer data;
    disassociating the first sub-set of the operational data paths from the initial multipathing process;
    identifying an active one of the operational data paths that is being used to transfer data;
    disassociating the active one of the operational data paths from the initial multipathing process;
    identifying a second sub-set of the operational data paths that are associated with the initial multipathing process; and
    disassociating the second sub-set of the operational data paths from the initial multipathing process.

11. The computer system as claimed in claim 10, wherein associating the disassociated operational data paths with the upgraded multipathing process comprises:
    associating the first sub-set of operational data paths with the upgraded multipathing process;
    associating the active one of the operational data paths with the upgraded multipathing process; and
    associating the second sub-set of the operational data paths with the upgraded multipathing process.

12. The computer system as claimed in claim 9, wherein at least one inoperable data path is disassociated from the initial multipathing process, and the inoperable data path is associated with the upgraded multipathing process.

13. The computer system as claimed in claim 9, wherein the initial multipathing process is terminated subsequent to disassociating the operational data paths from the initial multipathing process and disassociating the inoperable data path from the initial multipathing process.

14. The computer system as claimed in claim 10, wherein the first sub-set of the operational data paths are supported by a plurality of communication elements such that failure of one of the communication elements does not render the first sub-set of operational data paths inoperable.

15. A non-transitory computer readable medium storing a computer program comprising at least one instruction, which when executed by a computing system causes the computing system to perform the steps of:
    establishing a plurality of concurrent operating multipathing processes responsible for managing a plurality of operational data paths on the computer system, said concurrent operating multipathing processes comprising an initial multipathing process and an upgraded multipathing process;
    disassociating a plurality of operational data paths from the initial multipathing process; and
    associating the operational data paths with the upgraded multipathing process.

16. A non-transitory computer readable medium storing a computer program comprising at least one instruction, which when executed by a computing system causes the computing system to perform the steps of:
    establishing a plurality of concurrent operating multipathing processes responsible for managing a plurality of operational data paths in the computer system, said concurrent operating multipathing processes comprising an initial multipathing process and an upgraded multipathing process;
    disassociating a plurality of operational data paths from the initial multipathing process; and
    associating the disassociated operational data paths with the upgraded multipathing process, -wherein disassociating the operational data paths comprises:
    identifying a first sub-set of the operational data paths that are not being used to transfer data;
    disassociating the first sub-set of the operational data paths from the initial multipathing process;
    identifying an active one of the operational data paths that is being used to transfer data;
    disassociating the active one of the operational data paths from the initial multipathing process;
    identifying a second sub-set of the operational data paths that are associated with the initial multipathing process; and
    disassociating the second sub-set of the operational data paths from the initial multipathing process.

17. The computer readable medium of claim 16, further comprising at least one instruction causing the computing system to perform the steps of:
    associating the first sub-set of operational data paths with the upgraded multipathing process;
    associating the active one of the operational data paths with the upgraded multipathing process; and
    associating the second sub-set of the operational data paths with the upgraded multipathing process.

18. The computer readable medium of claim 15, further comprising at least one instruction causing the computing system to perform the steps of:
    disassociating at least one inoperable data path from the initial multipathing process; and
    associating the inoperable data path with the upgraded multipathing process.

19. The computer readable medium of claim 15, further comprising at least one instruction causing the computing system to perform the step of terminating the initial multipathing process subsequent to performing the steps of disassociating the operational data paths from the initial multipathing process and disassociating the inoperable data path from the initial multipathing process.

20. The computer readable medium of claim 16, wherein the first sub-set of the operational data paths are supported by a plurality of communication elements such that failure of one of the communication elements does not render the first sub-set of operational data paths inoperable.

* * * * *

UNITED STATES PATENT AND TRADEMARK OFFICE
CERTIFICATE OF CORRECTION

| | |
|---|---|
| PATENT NO. | : 8,874,806 B2 |
| APPLICATION NO. | : 11/492830 |
| DATED | : October 28, 2014 |
| INVENTOR(S) | : Satish Kumar Mopur et al. |

It is certified that error appears in the above-identified patent and that said Letters Patent is hereby corrected as shown below:

In the Claims,

In column 8, line 65, in Claim 7, delete "(n -1)/2" and insert -- (n-1)/2 --, therefor.

In column 10, line 24, in Claim 16, delete "-wherein" and insert -- wherein --, therefor.

Signed and Sealed this
Seventeenth Day of March, 2015

Michelle K. Lee
*Director of the United States Patent and Trademark Office*